(12) United States Patent
Kim

(10) Patent No.: US 11,073,096 B2
(45) Date of Patent: Jul. 27, 2021

(54) VEHICLE AND CONTROLLING METHOD THEREOF

(71) Applicants: Hyundai Motor Company, Seoul (KR); Kia Motors Corporation, Seoul (KR)

(72) Inventor: Gyuhong Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/582,585

(22) Filed: Sep. 25, 2019

(65) Prior Publication Data

US 2020/0340413 A1   Oct. 29, 2020

(30) Foreign Application Priority Data

Apr. 25, 2019 (KR) ................. 10-2019-0048395

(51) Int. Cl.
  *F02D 41/02*   (2006.01)
  *B60W 20/16*   (2016.01)
  *F01N 9/00*   (2006.01)

(52) U.S. Cl.
  CPC .......... *F02D 41/029* (2013.01); *B60W 20/16* (2016.01); *F01N 9/002* (2013.01); *F01N 2430/00* (2013.01); *F01N 2550/04* (2013.01); *F02D 2200/0802* (2013.01)

(58) Field of Classification Search
CPC combination set(s) only.
See application file for complete search history.

(56) References Cited

U.S. PATENT DOCUMENTS

| | | | |
|---|---|---|---|
| 9,534,524 B1* | 1/2017 | Hopka | F02D 41/1466 |
| 10,066,533 B2* | 9/2018 | Kogo | F02D 19/0613 |
| 2011/0072791 A1* | 3/2011 | Bidner | F01N 13/009 |
| | | | 60/278 |
| 2013/0060446 A1 | 3/2013 | Kim et al. | |
| 2014/0165979 A1* | 6/2014 | Nishijima | G01N 15/0606 |
| | | | 123/672 |
| 2016/0160723 A1* | 6/2016 | Thomas | F01N 3/101 |
| | | | 60/274 |
| 2017/0204761 A1 | 7/2017 | Ulrey et al. | |
| 2018/0149102 A1* | 5/2018 | Kobashi | F01N 3/023 |
| 2019/0017423 A1* | 1/2019 | Martin | F01N 9/002 |

\* cited by examiner

*Primary Examiner* — Binh Q Tran
(74) *Attorney, Agent, or Firm* — Mintz Levin Cohn Ferris Glovsky and Popeo, P.C.; Peter F. Corless

(57) ABSTRACT

A vehicle is provided and includes a GPF (gasoline particulate filter) that is configured to store a soot generated in an engine and burn the soot and a sensor that is configured to detect a first soot mass included in the GPF. A controller is configured to calculate a second soot mass estimated at the ignition off based on the detected first soot mass and determine an inlet temperature of the GPF based on the second soot mass and a predetermined reference value. The engine is then operated based on the determined inlet temperature of the GPF.

18 Claims, 7 Drawing Sheets

RELATED ART

VEHICLE AND CONTROLLING METHOD THEREOF

CROSS-REFERENCE TO RELATED APPLICATION

This application is based on and claims priority under 35 U.S.C. § 119 to Korean Patent Application No. 10-2019-0048395, filed on Apr. 25, 2019, the disclosure of which is incorporated by reference herein in its entirety.

BACKGROUND

1. Field of the Disclosure

The present disclosure relates to a hybrid vehicle using at least two power sources and a controlling method of the hybrid vehicle, and more particularly, to a hybrid vehicle that reduces the number of times, in which that an engine is additionally turned on, by determining whether soot removal is necessary.

2. Description of the Related Art

A vehicle may be classified into an internal combustion engine vehicle, a hybrid electric vehicle, and an electric vehicle, based on the type of the power source generating the driving force. The internal combustion engine vehicle is a type of vehicle that burns fossil fuels and generates power. To respond to the current depletion of fossil fuels used as fuel for internal combustion engine vehicles and environmental pollution problems, the hybrid electric vehicles and the electric vehicles are being developed.

The hybrid vehicle may be classified into two different forms. Specifically, the hybrid vehicle includes a hybrid electric vehicle (HEV) that uses driving forces of the internal combustion engine and drives a motor taking energy from a battery recharged by a regenerative energy generated when braking. The hybrid vehicle includes a plug-in hybrid vehicle (PHEV) with a battery capable of being recharged by plugging the battery into an external source of electric power.

The hybrid vehicle also includes an Atkinson cycle engine instead of an auto-cycle engine, which is used in an internal combustion engine vehicle, to improve fuel economy. In the Atkins cycle engine, there is a disadvantage that the output decreases. Recently, the hybrid vehicle has been equipped with a gasoline direct injection (GDI) engine to compensate for the disadvantages of the Atkins cycle engine. However, in the GDI engine, a substantial amount of soot is generated.

SUMMARY

Therefore, the present disclosure provides a hybrid vehicle capable of improving fuel economy and reducing the number of times, in which that an engine is additionally turned on, by determining whether soot removal is necessary when it is already determined to turn on the engine, and a controlling method thereof.

In accordance with one aspect of the present disclosure, a vehicle may include a gasoline particulate filter (GPF) configured to store a soot generated in an engine and burn the soot; a sensor configured to detect a first soot mass included in the GPF; and a controller configured to calculate a second soot mass estimated at ignition off based on the detected first soot mass and determine an inlet temperature of the GPF based on the second soot mass and a predetermined reference value and operate the engine based on the determined inlet temperature of the GPF.

The controller may be configured to turn on the engine for an air conditioner and determine an operation of engine based on the determined inlet temperature of the GPF. The vehicle may further include an inputter configured to receive a heating temperature of an air conditioner from a user. The controller may be configured to compare a cooling water temperature of the engine detected by the sensor with the heating temperature and determine whether to turn on the engine based on the comparison. The controller may also be configured to determine the inlet temperature of the GPF based on the comparison and a driving speed detected by the sensor.

Additionally, the controller may be configured to determine a first inlet temperature of the GPF when the second soot mass exceeds the predetermined reference value and determine a second inlet temperature of the GPF less than the first inlet temperature of the GPF when the second soot mass is equal to or less than the predetermined reference value. The controller may be configured to operate the engine based on at least one of a revolution per minute (RPM), an ignition timing, or an air-conditioning ratio. The controller may be configured to turn off the engine when the detected first soot mass is equal to or less than the predetermined reference value.

The controller may further be configured to determine whether to turn on the engine based on a high-voltage battery power consumed by a Low Direct Voltage Converter (LDC) apparatus, and operate the engine based on the determined inlet temperature of the GPF. The controller may also be configured to determine whether to turn on the engine based on a charging amount of a high-voltage battery, and operate the engine based on the determined inlet temperature of the GPF. The controller may be configured to calculate the second soot mass based on at least one of the first soot mass, a soot accumulation speed, an average time of ignition or a time correction.

In accordance with another aspect of the present disclosure, the controlling method of a vehicle may include determining whether to turn on an engine for an air conditioner; calculating a second soot mass estimated at the ignition off based on a first soot mass stored in a GPF; determining an inlet temperature of the GPF based on the second soot mass and a predetermined reference value; and operating the engine based on the determined inlet temperature of the GPF.

The determining of whether to turn on an engine may include receiving a temperature value of the air conditioner from a user; and comparing a cooling water temperature with a heating temperature of the air conditioner. The inlet temperature of the GPF may be determined based on the comparison and a driving speed of the vehicle. Additionally, the determining of the inlet temperature of the GPF may include determining a first inlet temperature of the GPF when the second soot mass exceeds the predetermined reference value; and determining a second inlet temperature of the GPF less than the first inlet temperature of the GPF when the second soot mass is equal to or less than the predetermined reference value. The engine may be operated based on at least one of an RPM, an ignition timing, or an air-conditioning ratio.

The method may further include turning off the engine when the detected first soot mass is equal to or less than the predetermined reference value. In addition, the method may include determining whether to turn on the engine based on a high-voltage battery power consumed by an LDC determining whether to turn on the engine based on a charging amount of a high-voltage battery. The second soot mass may be calculated based on at least one of the first soot mass, a soot accumulation speed, an average time of ignition or a time correction.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
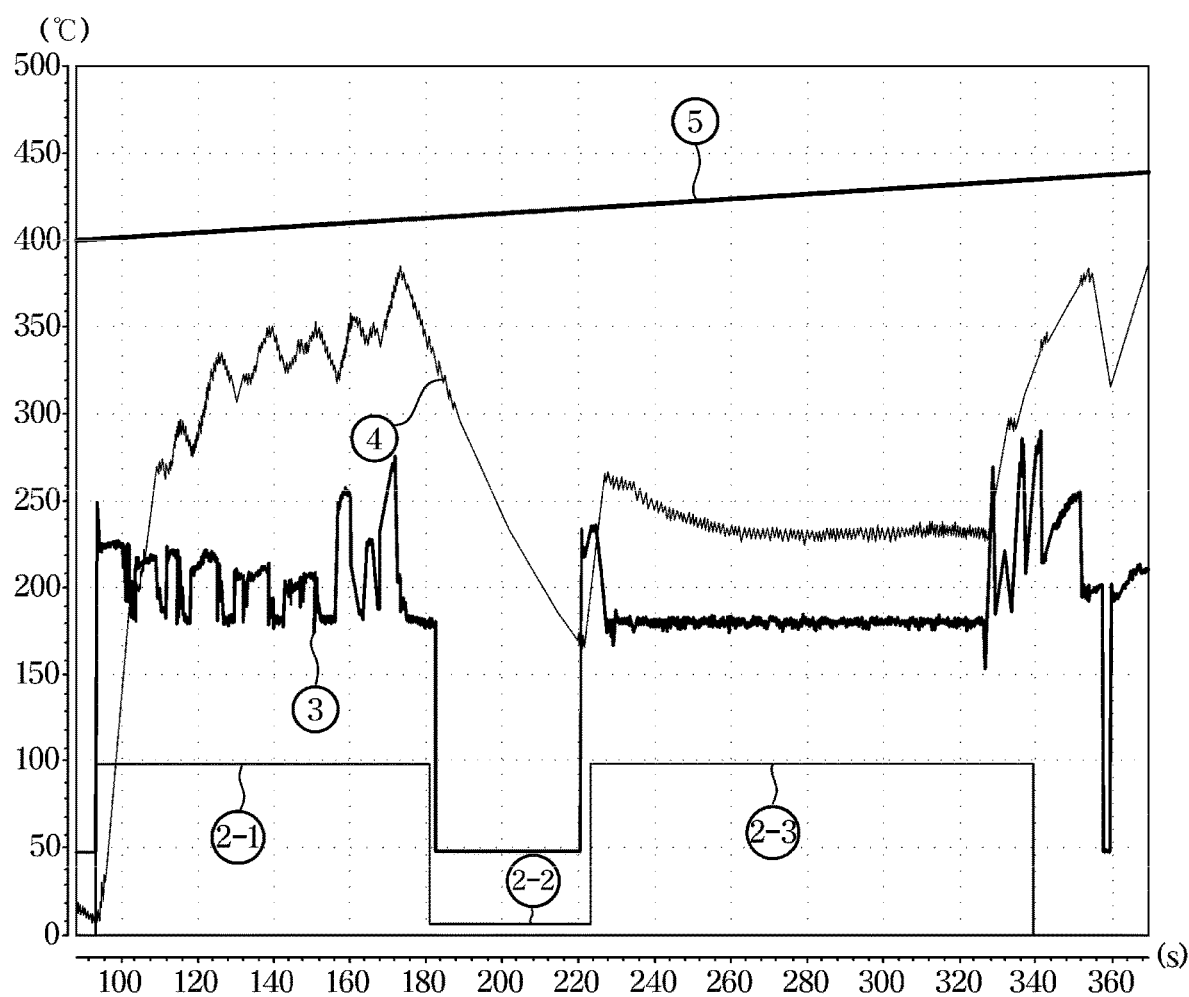
FIG. 1 is a graph illustrating a problem that may occur in a conventional hybrid vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of embodiments of the present disclosure will be described, and description of what are commonly known in the art or what overlap each other in the exemplary embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements. It will be further understood that the term "connect" or its derivatives refer both to direct and indirect connection, and the indirect connection includes a connection over a wireless communication network.

Reference numerals used for method steps are just used for convenience of explanation, but not to limit an order of the steps. Thus, unless the context clearly dictates otherwise, the written order may be practiced otherwise. The principle and embodiments of the present disclosure will now be described with reference to accompanying drawings.

FIG. 1 is a graph illustrating a problem that may occur in a conventional hybrid vehicle. The graph of FIG. 1 shows whether an engine is turned on (2-1, 2-2, and 2-3) for operating an air conditioner (e.g., FATC, Full Automatic Temperature Control). The graph of FIG. 1 shows the relationship between the engine RPM (Revolutions Per Minute) 3, the inlet temperature 4 of a gasoline particulate filter (GPF) and soot mass 5 stored in the GPF, respectively. In the graph of FIG. 1, the X axis represents time (s), and the Y axis represents the inlet temperature (c) of GPF.

The GPF is a filter that stores soot generated during combustion and burns stored soot when a predetermined condition is satisfied (so-called GPF regeneration). The predetermined condition corresponds to the inlet temperature of the GPF. When the inlet temperature of the GPF is equal to or greater than a predetermined temperature, the GPF regeneration is performed. Referring to FIG. 1, the inlet temperature 4 of the GPF decreases sharply during the period of 180 s to 220 s when the engine is turned off (2-2). In other words, the hybrid vehicle, which often turns off the engine, is disadvantageous to reach the inlet temperature of the GPF for regenerating the GPF compared to the vehicle of the internal combustion engine.

The conventional hybrid vehicle often turns on the engine (2-1, and 2-3) to operate the air conditioner regardless of the remaining amount of the charged battery. The engine-on (2-1, and 2-3) operation for the FATC was aimed at increasing the engine coolant temperature, which was also disadvantageous to fuel economy. The conventional hybrid vehicle has performed a control operation for turning on the engine to burn soot independently of a control operation of the engine for FATC.

Referring again to FIG. 1, during driving of the hybrid vehicle, the soot mass 5 is expected to increase. Although the control for turning on the engine for GPF regeneration should be performed in the near future, the engine is turned on/off independently for the FATC. Additionally, the inlet temperature 4 of the GPF was increased to about 400° C. at the first engine on 2-1, but the inlet temperature 4 of the GPF decreased to about 150° C. during engine off 2-2. When the engine on (2-3) for the independent FATC is performed again, the inlet temperature 4 of the GPF may be increased to 400° C. However, conditions for GPF regeneration (e.g., inlet temperature of GPF of 630° C.) are not achieved. As a result, when the soot mass 5 is deposited to a predetermined reference value or more, the conventional hybrid vehicle turns the engine on again. Therefore, the conventional hybrid vehicle wastes the fuel by turning the engine on every different situation.

Figure 2:
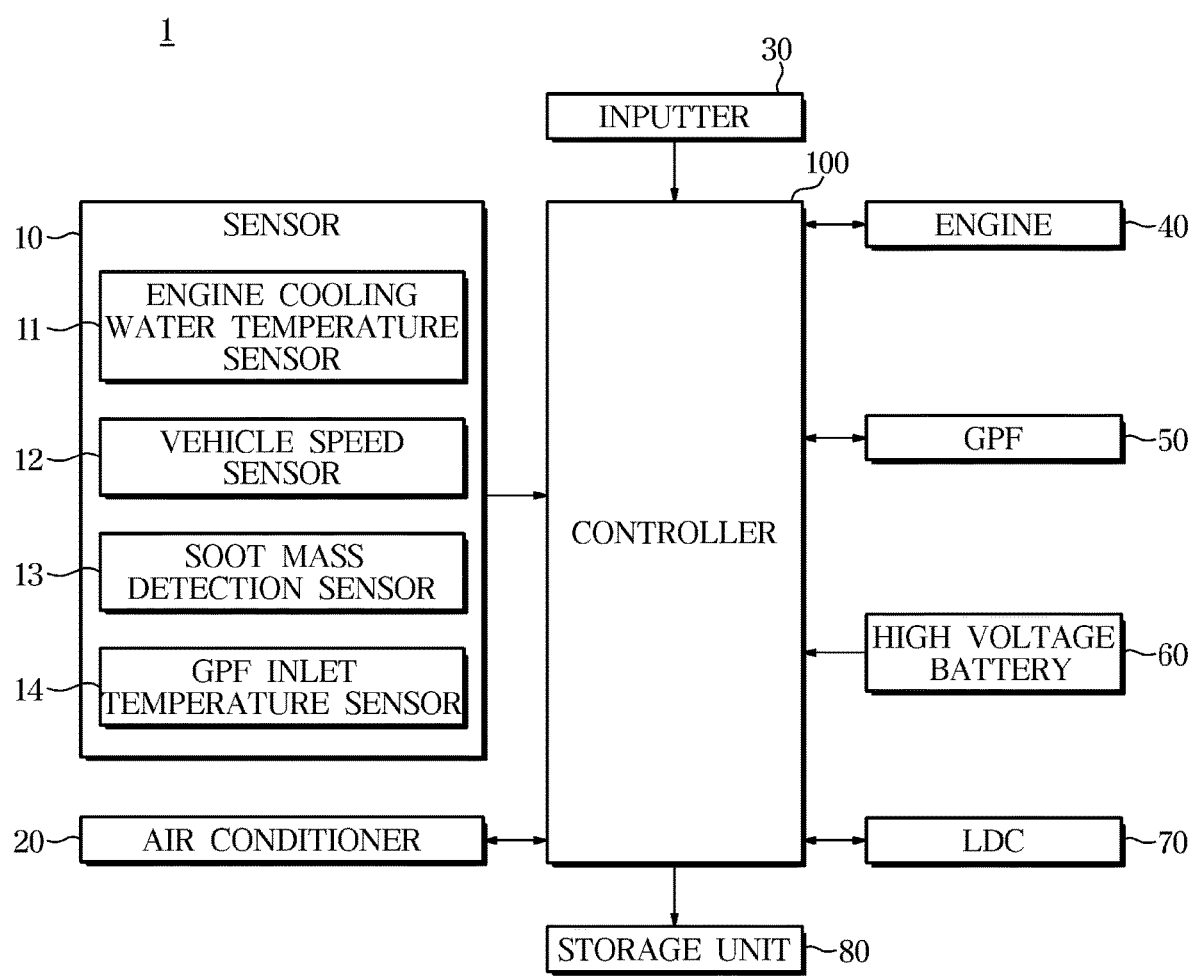
FIG. 2 is a block diagram of the disclosed vehicle according to an exemplary embodiment of the disclosure.

FIG. 2 is a block diagram of the disclosed vehicle. Referring to FIG. 2, the disclosed vehicle 1 may include a sensor 10 configured to collect various data, an air conditioner 20 configured to adjust the internal temperature of the vehicle 1, an inputter 30 configured to receive a command from a user, an engine 40 and a high-voltage battery 60 configured to supply power to the vehicle 1, a GPF 50 configured to store soot generated in the engine 40 and burn the soot, a low-direct direct voltage converter (LDC) 70 configured to convert electric energy provided by the high-voltage battery 60 into 12V low-voltage electric energy, a storage unit 80 configured to store the collected various data and programs, and a controller 100 configured to operate above-described configuration of the vehicle 1.

Specifically, the sensor 10 may include a sensor 11 configured to detect the temperature of the cooling water of the engine 40, a sensor 12 configured to detect the speed of the vehicle 1, a sensor 13 configured to detect the soot mass stored in the GPF 50 and a sensor 14 configured to detect the temperature of the inlet of the GPF 50. The controller 100 may be configured to determine a cooling water temperature required for the heating operation of the air conditioner 20 based on the cooling water temperature measured by the sensor 11, and the controller may be configured to determine whether to turn on the engine to operate the air conditioner 20.

The controller 100 may utilize the vehicle speed detected by the sensor 12 to consider a cooling effect based on the wind amount and the wind speed generated by driving. The vehicle speed may be calculated by the detection value of the hardware sensor and also by the calculation of the controller 100. The controller 100 may utilize a detected value of the sensor 13 to determine whether to turn on the engine for GPF regeneration. The sensor 13 may be provided in the GPF 50. The controller 100 may be configured to determine whether to turn on the engine 40 and whether to operate the GPF 50, based on the detection value of the sensor 14. Specifically, the controller 100 may be configured to turn on the engine 40 to increase the inlet temperature of the GPF to the target temperature described below, and performs the GPF regeneration.

In addition, the sensor 10 may further include a plurality of various sensors. The air conditioner 20 refers to a hardware device configured to adjust the temperature inside the vehicle 1. Specifically, the air conditioner 20 may include a condenser, a compressor, an evaporator, a receiver, and an expansion device. Through the hardware devices, fully automatic temperature control (FATC) that maintains the internal temperature of the vehicle 1 may be performed. The air conditioner 20 may be configured to adjust the temperature of the air discharged from a vent (not shown) based on the temperature of the cooling water of the engine 40. In other words, when the current engine cooling water temperature is less than the required heating temperature, the controller 100 may be configured to turn on the engine 40 and heat the cooling water. A specific description thereof will be described later with reference to other drawings.

Furthermore, the inputter 30 may be configured to receive various input commands from the user. In particular, the inputter 30 may be configured to receive the input command related to the operation of the air conditioner 20 from a user, for example, a command relating to a target temperature inside the vehicle 1. The input command received by the inputter 30 may be transmitted to the controller 100. The input command may be used by the controller 100 to determine whether excessive use of electrical energy stored in the high voltage battery 60 is desired and whether additional engine ON is required.

The inputter 30 may include various hardware devices such as buttons, switches, pedals, a keyboard, a mouse, a track-ball, levers, a handle, a stick and the like, as well as a steering wheel (not shown). Additionally, the input command for fuel economy may be input by a user's touch on a display interlocked with an audio video navigation (AVN) device. In particular, the inputter 30 may be a graphical user interface, i.e. software device. The touch pad is implemented as a touch screen panel (TSP), and may form a mutual layer structure with AVN (Audio Video Navigation).

The engine 40 and the high-voltage battery 60 are power sources for supplying power to the vehicle 1. Specifically, the engine 40 is a general internal combustion engine, and the air conditioner 20 uses the cooling water the temperature of which may be increased by the engine 40 while heating the interior of the vehicle 1. The high voltage battery 60 may be configured to supply electric power to various electric devices included in the vehicle 1 and an electric motor (not shown) provided in the vehicle 1. The disclosed high-voltage battery 60 refers to a high-output large-capacity battery used in a hybrid vehicle according to an exemplary embodiment, and includes stacked cells of 96 or more battery cells (e.g., battery basic unit having a voltage of 3.6 V to 3.7 V). For example, the high voltage battery 60 may have a nominal voltage of approximately 360V to 400V.

The electric motor refers to a device driven by the poly-phase alternating current (AC) power of an inverter to generate power (rotational force). The wheel rotates by the power transmitted from the electric motor and/or the engine 40. The GPF 50 is a filter for controlling exhaust gas emitted by the engine 40 and removing particulates contained in the exhaust gas. Specifically, the GPF 50 may store soot that the engine 40 generates while burning gasoline. The controller 100 may be configured to operate the GPF 50 when the predetermined condition is satisfied, and the GPF 50 may be configured to turn the stored soot.

Notably, the vehicle 1 may include an internal combustion engine using gasoline as a power source. Therefore, the filter that stores the soot discharged by the engine 40 has been described as the GPF 50. However, the disclosed exemplary embodiment is not limited to the GPF 50, and in the case of the engine 40 using diesel as a power source, the GPF 50 may be changed to a diesel particulate filter (DPF).

Further, the LDC 70 is a converter system configured to convert the electrical energy supplied by the high voltage battery 60 to 12V low voltage electrical energy. The LDC may be configured to supply electrical energy of 12V voltage to various electronic devices provided in the disclosed vehicle 1. In the exemplary embodiment, the LDC 70 operates when an electronic device having a large power load such as a seat warmer or a headlight is used. Specifically, an electronic device with a relatively small power load may be supplied with electrical energy by an auxiliary battery (not shown) provided in the vehicle 1. However, when an electronic device with a large power load performs, the controller 100 may be configured to operate the LDC 70 and supply the electrical energy of the high-voltage battery 60 to the electronic device with a large power load, together with the electrical energy of the auxiliary battery.

The storage unit 80 may be configured to store detection values collected by the sensor 10 and various programs and data necessary for the vehicle 1 to operate. The storage unit 80 may include Cache, Read Only Memory (ROM), Random Access Memory (RAM), Compact Disk-Read Only Memories (CD-ROMs), magnetic tapes, floppy disks, and optical recording medium. Additionally, the medium may be a non-transitory computer-readable medium. The media may also be a distributed network, so that the computer readable code is stored or transferred and executed in a distributed fashion. Still further, as merely an example, the processing element may include at least one processor or at least one computer processor, and processing elements may be distributed and/or included in a single device.

Moreover, the controller 100 may be configured to execute the overall operation of the vehicle 1. Specifically, the controller 100 may be configured to receive a detection value (hereafter referred to as a first soot mass) related to the accumulation amount of soot stored by the GPF 50 while the vehicle 1 is running, and calculate a second soot mass expected at the end of driving based on the first soot mass. The controller 100 may be configured to determine the inlet temperature of the GPF based on the calculated second soot mass and a predetermined reference value. Then, the controller 100 may be configured to turn on the engine 40 and adjust the RPM of the engine 40, the ignition timing of the engine 40 or the air-fuel ratio based on the determined inlet temperature of the GPF.

The inlet temperature of the GPF determined by the controller 100 may be used for engine control for cooperative regeneration, which simultaneously performs the heating operation of the air conditioner 20 and the GPF regeneration. A detailed description related thereto will be given later with reference to the drawings. The controller 100 includes a memory (not shown) to store algorithms for executing the operations of components of the vehicle 1 or data regarding programs for executing the algorithms, and a processor (not shown) to perform the above-described operation using the data stored in the memory. In various exemplary embodiments, the memory and the processor are implemented as separate chips, and in other embodiments the memory and the processor are implemented as a single chip.

Figure 3:
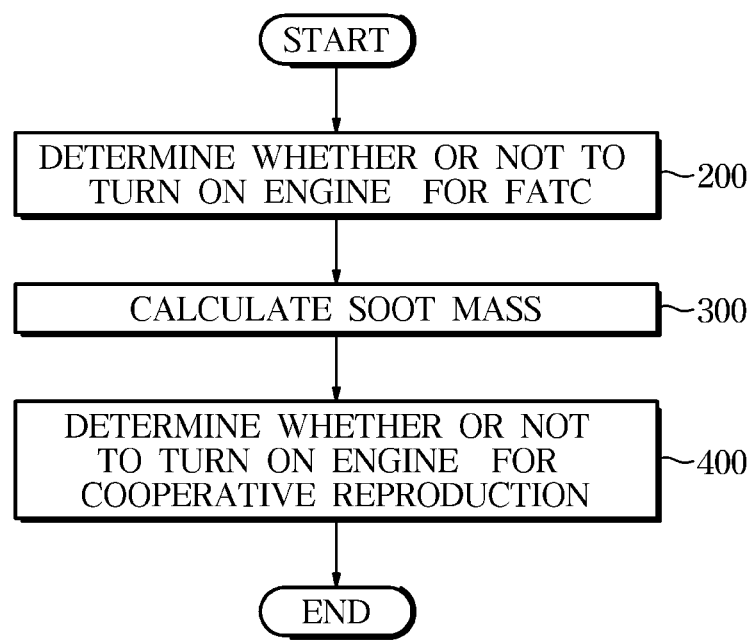
FIG. 3 is a flowchart illustrating a controlling method of the vehicle according to an exemplary embodiment of the disclosure.

FIG. 3 is a flowchart illustrating a controlling method of the vehicle according to an exemplary embodiment of the disclosure. Referring to FIG. 3, the controller 100 may be configured to determine whether to turn on the engine 40 for FATC (200). Specifically, the controller 100 may be configured to operate the air conditioner 20 through the FATC. For example, when the user transmits an input command, the controller 100 may be configured to detect the internal temperature of the vehicle 1 using the sensor 10. When the target temperature of the air conditioner 20 input by the user is less than the current internal temperature of the vehicle 1, the controller 100 may be configured to execute the heating operation using the air conditioner 20.

Particularly, the controller 100 may be configured to execute compensation in consideration of the vehicle speed to correct the cooling effect due to the wind flowing into the vehicle as the vehicle 1 is being driven, and the controller 100 may be configured to determine whether to adjust the temperature of the cooling water by operating the engine 40, based on the comparison result. A detailed description thereof will be given later with reference to FIG. 4. In response to determining that the engine 40 is on, the controller 100 may be configured to calculate the soot mass of the GPF 50 (300).

In the conventional hybrid vehicle in the related art, the soot mass of the GPF 50 is simply detected, and the engine ON for the GPF regeneration is performed independently of the engine ON for the FATC. However, the disclosed vehicle 1 may increase the fuel consumption by determining whether to perform the engine ON for the GPF regeneration together with the engine ON for FATC. Based on the soot mass detected by the sensor 10, the controller 100 may be configured to calculate the soot mass expected at the ignition off point. The expected soot mass at the ignition off point may be calculated using a series of factors such as a soot accumulation speed, an average time of ignition or time correction. A detailed description thereof will be given later with reference to FIG. 5.

Particularly, the controller 100 may be configured to determine whether to turn on the engine for cooperative reproduction (400). Cooperative reproduction refers to an operation of determining whether the engine 40 turns on in different independent situations and executing the configurations of the vehicle 1 according to the determination of an operation of the engine 40. Specifically, the controller 100 may be configured to compare the calculated soot mass with a predetermined reference value, and determine whether to perform the GPF regeneration. Since the engine ON for FATC is already determined in step 300, the controller 100 may be configured to additionally determine whether the engine ON for GPF regeneration is necessary. A detailed description thereof will be given later with reference to FIGS. 5 and 6.

Figure 4:
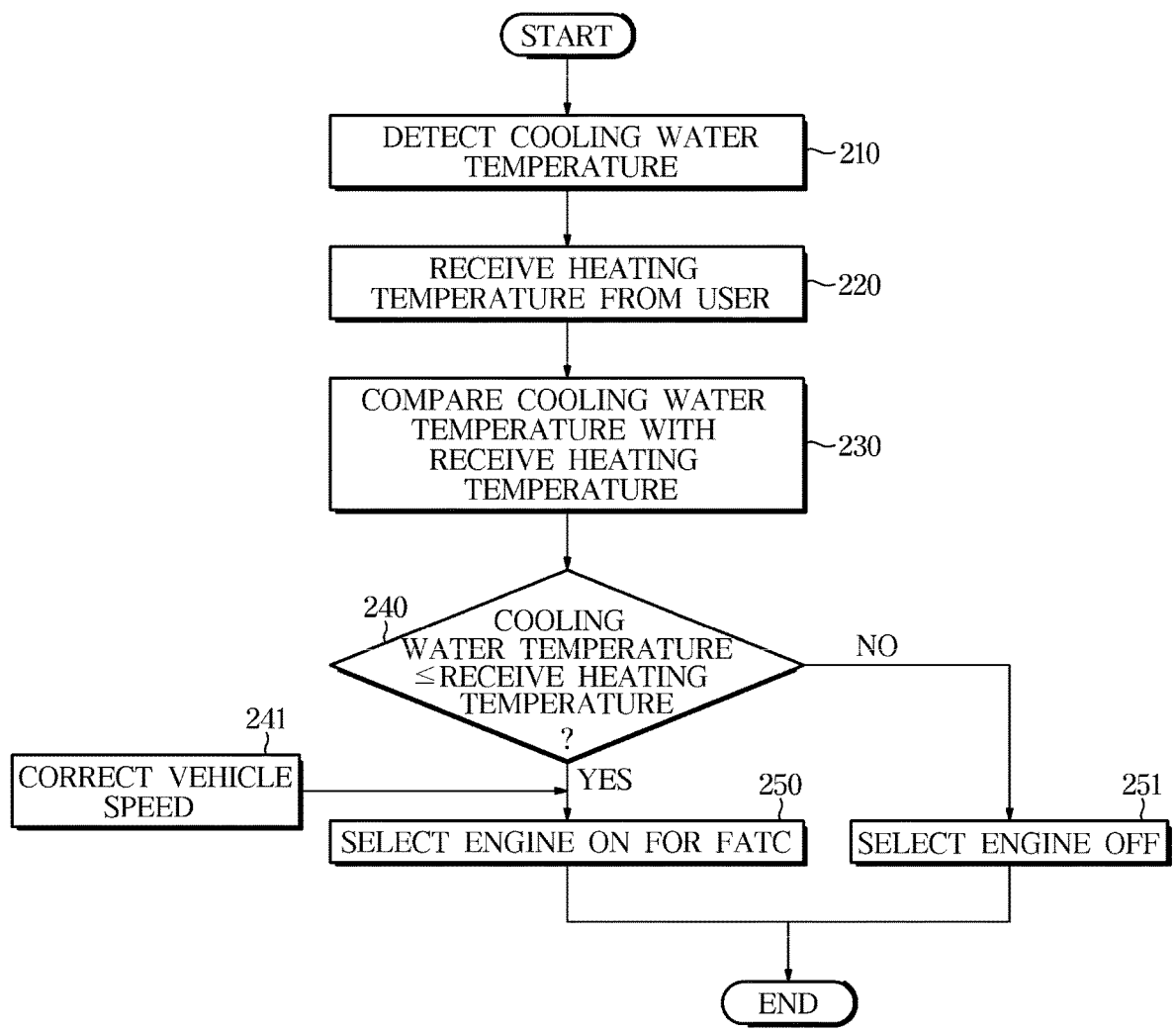
FIG. 4 is a flowchart illustrating determining of the engine ON for FATC according to an exemplary embodiment of the disclosure.

FIG. 4 is a flowchart illustrating determining of the engine ON for FATC. Referring to FIG. 4, the controller 100 may be configured to detect the cooling water temperature of the engine 40 (210). Specifically, the controller 100 may be configured to receive the cooling water temperature from the engine cooling water temperature sensor 11. The controller 100 may also be configured to receive a heating temperature of an air conditioner input from the user (220). The heating temperature is a temperature value received through the inputter 30, and the controller 100 may be configured to perform the FATC control based on the received temperature value.

The controller 100 may then be configured to compare the received cooling water temperature with the heating temperature input from the user (230). When the cooling water temperature is greater than the heating temperature, the controller 100 may be configured to determine the engine off (251). In other words, the controller may be configured to determine that the engine is off and no engine on is required. However, when the cooling water temperature is less than the heating temperature, the controller 100 may be configured to select the engine ON (250).

Further, the controller 100 may be configured to determine whether the engine 40 should be operated to a particular level while selecting the engine ON. Generally, the operation of the engine 40 required for the operation of the air conditioning 20 includes adjusting the revolution per minute (RPM) or the air-fuel ratio to increase the inlet temperature of the GPF to about 400° C. The controller 100 may be configured to select a control level of the engine 40 through the vehicle speed correction (241). The cooling/heating load may be determined by the temperature inside or outside the vehicle 1 collected by the sensor 30 and the air conditioner.

The vehicle speed correction indicates that the temperature of the wind, which flows in the air conditioner 20 while the vehicle 1 is being driven, is applied to the control of the engine 40. Specifically, the controller 100 may be configured to determine the degree of cooling water increase of the engine 40 based on the external temperature of the vehicle 1 and the vehicle speed, and then adjust the RPM or the air-fuel ratio.

Figure 5:
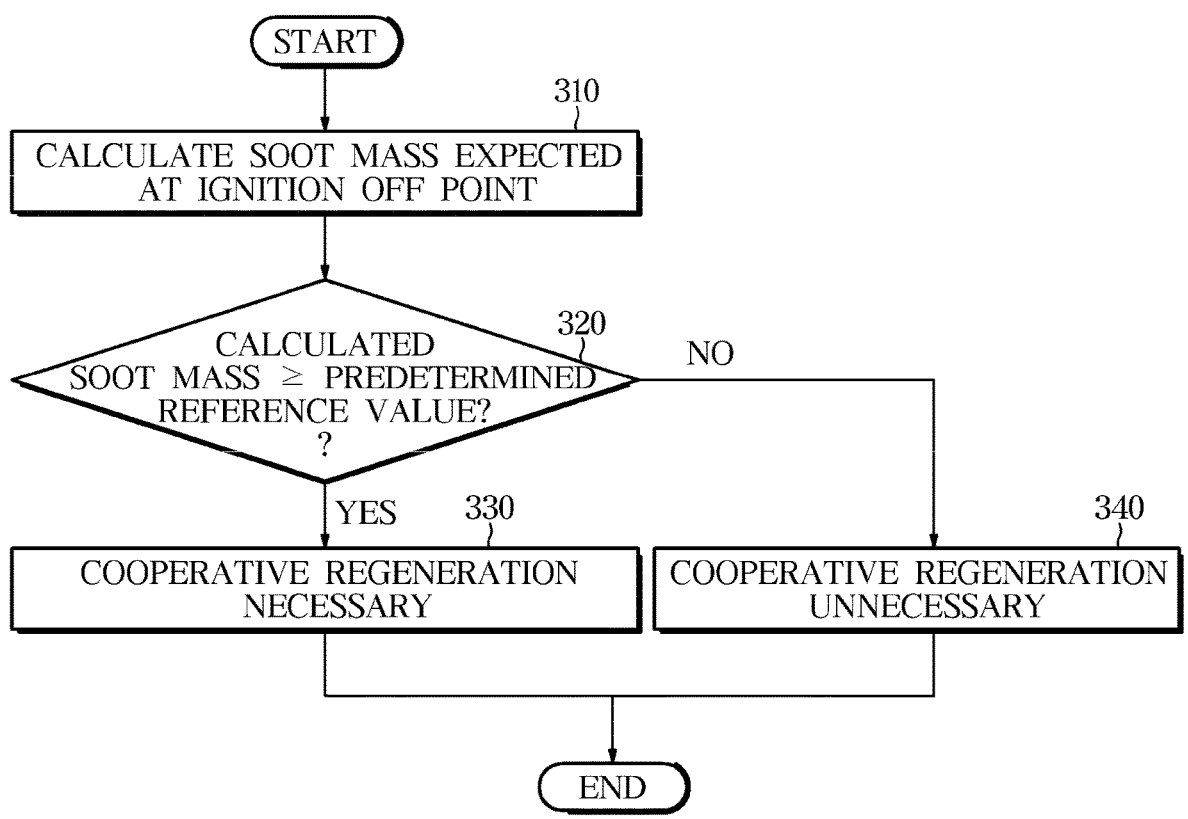
FIG. 5 is a flowchart illustrating the process of calculating the soot mass and determining the inlet temperature of the GPF according to an exemplary embodiment of the disclosure.

FIG. 5 is a flowchart illustrating the process of calculating the soot mass and determining the inlet temperature of the GPF. As described above with reference to FIG. 4, even if the engine ON for FATC is determined, the controller 100 does not immediately operate the engine 40, but once again may be configured to determine whether cooperative reproduction is necessary. Referring to FIG. 5, the controller 100 may be con figured to estimate the soot mass to thus determine whether GPF regeneration is necessary. When the controller 100 determines that GPF regeneration is required, the controller 100 may be configured to operate the engine 40 so that GPF regeneration may be performed simultaneously performing engine ON for FATC.

First, the controller 100 may be configured to calculate a soot mass expected at the ignition off point (310). Specifically, the controller 100 may be configured to detect the soot mass stored in the current GPF 50 (the first soot mass described above) from the soot mass detection sensor 13. The controller 100 may then be configured to calculate the accumulation amount of the expected soot at the ignition off point by applying a predetermined factor such as a soot accumulation speed, an average time of ignition and a time correction, to the following equation (1).

$$\text{the second soot mass} = \text{the first soot mass} + (\text{a soot accumulation speed} * \text{an average time of ignition} * \text{a time correction}) \qquad \text{Equation 1}$$

wherein the soot accumulation speed may be a statistic of the soot mass detected by the sensor 13 at a preset period, or may be a predetermined value in the storage unit 80.

The average time of ignition may be determined based on the driving pattern of the user, and the controller 100 may be configured to calculate the running time after accumulating the previous driving time in the storage unit 80. However, the average time of ignition may be a predetermined value as well as the soot accumulation speed. The time correction may be predetermined by the manufacturer, for correcting the difference between the actual ignition off point of the vehicle 1 and the above-described factors.

When the second soot mass is calculated according to equation (1), the controller 100 may be configured to compare the calculated soot mass with a predetermined reference value (320). The predetermined reference value is the soot mass of the GPF 50, which may be determined according to the capacity of the GPF 50. When the second soot mass is equal to or greater than the predetermined reference value, the controller 100 may be configured to determine that cooperative regeneration is necessary (330). Accordingly, the controller 100 may be configured to operate the engine 40 to heat the inlet temperature of the GPF to about 630° C. to 650° C.

When the second soot mass is less than the predetermined reference value, the controller 100 may be configured to determine that cooperative regeneration is unnecessary (340). Accordingly, the controller 100 may be configured to operate the engine 40 for FATC. Specifically, the controller 100 may be configured to operate the engine 40 to heat the inlet temperature of the GPF to about 400° C.

Figure 6:
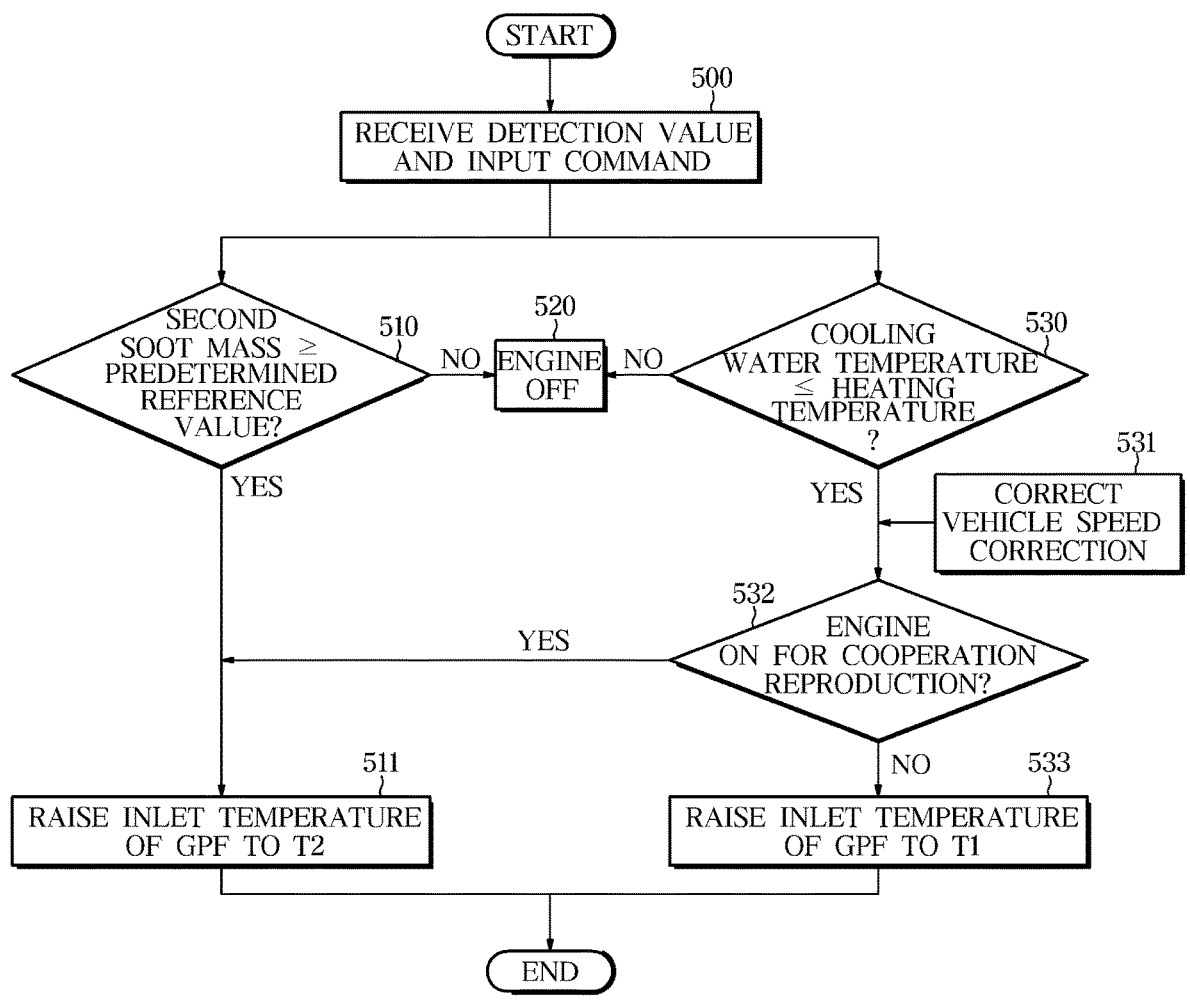
FIG. 6 is a flowchart showing an independent control method of the engine according to an exemplary embodiment of the disclosure.

FIG. 6 is a flowchart showing an independent control method of the engine. Referring to FIG. 6, the controller 100 may be configured to receive various detection values from the sensor 10 and receive an input command from the inputter 30 (500). For example, the controller 100 may be configured to receive the heating temperature for adjusting the temperature of the interior of the vehicle 1 from the user, and receive the first soot mass stored and the cooling water temperature of the engine 40 from the sensor 10.

The controller 100 maybe configured to compare the second soot mass with a preset reference value (510). The second soot mass is an accumulation amount calculated from the first soot mass, and is an accumulation amount stored in the GPF 50 at ignition off point. The controller 100 may be configured to estimate the soot mass at the ignition off point and determine whether the GPF regeneration is necessary. When the second soot mass is less than the predetermined reference value, the controller 100 may be configured to maintain the engine 40 OFF (e.g., an engine off state) continuously (520).

Additionally, the controller 100 may be configured to determine whether GPF regeneration is necessary, and compare the cooling water temperature of the engine 40 with the heating temperature input from the user (530). The controller 100 may be configured to perform the correction based on the vehicle speed while comparing the cooling water temperature of the engine 40 with the heating temperature (531). Particularly, the controller 100 may be configured to compare the cooling water temperature, which is corrected by the vehicle speed, with the heating temperature and then determine whether cooperative regeneration is necessary (532).

When the engine ON for FATC is required, the controller 100 may be configured to simultaneously examine the comparison result between the second soot mass and the predetermined reference value. When the engine-ON for FATC is determined and the second soot mass is equal to or greater than the predetermined reference value, the controller 100 may be configured to perform cooperative reproduction. When the second soot mass is less than the predetermined reference value in a situation where the engine ON for FATC is determined, the controller 100 may be configured to operate the engine 40 by adjusting the inlet temperature of the GPF to T1 (e.g., about 400° C.). In other words, even when the general operation of engine 40 for FATC is to increase the inlet temperature of the GPF to T1, the heating operation of the air conditioner 20 is feasible.

In contrast, when cooperative regeneration is required, the controller 100 may be configured to operate the engine 40 by regulating or adjusting the inlet temperature of the GPF to T2 (e.g., about 630° C. to 650° C.). For example, for GPF regeneration, the inlet temperature of the GPF should be T2. Accordingly, the controller 100 may be configured to increase the inlet temperature of the GPF to T2 by adjusting the RPM and the air-fuel ratio (511). When the inlet temperature of the GPF increases to T2, the heating operation of the air conditioner 20 and the soot burning of the GPF 50 may be performed together. After the operation of the engine 40 for the FATC is completed, the controller 100 does not perform the additional control of the engine 40 for the GPF regeneration, thereby improving the fuel economy.

Figure 7:
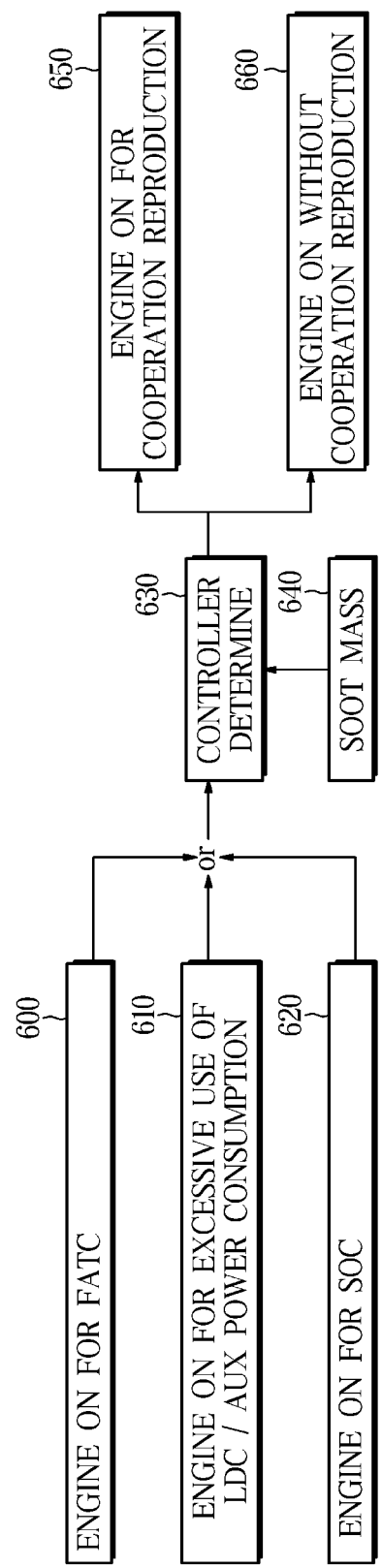
FIG. 7 is a view illustrating another exemplary embodiment related to cooperative reproduction.

FIG. 7 is a view illustrating another exemplary embodiment related to cooperative reproduction. Referring to FIG. 7, the vehicle 1 may be configured to determine whether to perform cooperative reproduction in a state of engine ON for charging the high-voltage battery 60, as well as in the state of the engine ON for FATC. Specifically, the vehicle 1 may be configured to determine whether the GPF regeneration is necessary in the state of engine ON by the excessive use of the LDC/AUX power consumption (610) or in the state of engine ON related to state of charge (SOC), as well as in the state of the engine ON for FATC.

The engine ON by the excessive use of the LDC/AUX power consumption may be caused by a use of electronic devices with high power loads such as seat warmer or a headlight of the vehicle 1. When the auxiliary battery is discharged, the ignition may not be possible (e.g., the engine may not be capable of being turned on due to insufficient power or battery discharge). Therefore, the vehicle 1 may be configured to maintain an auxiliary battery in a charged state. However, when an electronic device with a high power load is used, the vehicle 1 uses the electric energy of the auxiliary battery and the electric energy of the high-voltage battery 60 at the same time. When the electric energy of the high voltage battery 60 is continuously used through the LDC 70, the SOC of the high voltage battery 60 is exhausted and the vehicle 1 turns on the engine to charge the high voltage battery 60.

The vehicle 1 may also be configured to calculate the soot mass and determine whether cooperative regeneration is necessary, even when the engine 40 is turned on due to the excessive use of the LDC/AUX power consumption. In addition to the above engine ON by the excessive use of the LDC/AUX power consumption, the vehicle 1 may be configured to monitor the SOC of the high voltage battery 60 and turn on the engine 60 for self-charging of the high voltage battery 60. In this case, the controller 100 may be configured to calculate the soot mass and determine whether cooperative reproduction is necessary.

In the various situations described above, the vehicle 1 may be configured to determine engine ON for each or all of them and detect the first soot mass of the GPF 50. After calculating the second soot mass as illustrated in FIG. 5, the vehicle 1 may be configured to determine whether GPF regeneration is necessary (630). When GPF regeneration is required, the vehicle 1 may be configured to operate the engine 40 for cooperative regeneration (650) and adjust the RPM, the ignition timing or the air conditioning ratio to increase the inlet temperature of the GPF to T1. When the GPF regeneration is not required, the vehicle 1 may be configured to adjust the RPM, the ignition timing or the air conditioning ratio to increase the inlet temperature of the GPF to T2 (660). In particular, T2 may vary according to the various situations 600, 610, and 620.

Although a few exemplary embodiments of the disclosure have been shown and described, it would be appreciated by those skilled in the art that changes may be made in these exemplary embodiments without departing from the principles and spirit of the disclosure, the scope of which is defined in the claims and their equivalents

What is claimed is:

1. A vehicle, comprising:
   a gasoline particulate filter (GPF) configured to store a soot generated in an engine and burn the soot;
   a sensor configured to detect a first soot mass included in the GPF; and
   a controller configured to calculate a second soot mass estimated at ignition off based on the detected first soot mass, determine an inlet temperature of the GPF based on the second soot mass and a predetermined reference value, and operate the engine based on the determined inlet temperature of the GPF,
   wherein the controller is configured to compare a cooling water temperature of the engine detected by the sensor with a heating temperature of an air conditioner and determine whether to turn on the engine based on the comparison.

2. The vehicle according to claim 1, wherein the controller is configured to turn on the engine for the air conditioner and determine a control of the engine based on the determined inlet temperature of the GPF.

3. The vehicle according to claim 1, further comprising:
   an inputter configured to receive the heating temperature of the air conditioner from a user input.

4. The vehicle according to claim 3, wherein the controller is configured to determine the inlet temperature of the GPF based on the comparison and a driving speed detected by the sensor.

5. The vehicle according to claim 4, wherein the controller is configured to:
   determine a first inlet temperature of the GPF when the second soot mass exceeds the predetermined reference value; and
   determine a second inlet temperature of the GPF less than the first inlet temperature of the GPF when the second soot mass is less than or equal to the predetermined reference value.

6. The vehicle according to claim 1, wherein the controller is configured to operate the engine based on at least one of a revolution per minute (RPM), an ignition timing, or an air-conditioning ratio.

7. The vehicle according to claim 1, wherein the controller is configured to turn off the engine when the detected first soot mass is equal to or less than the predetermined reference value.

8. The vehicle according to claim 1, wherein the controller is configured to determine whether to turn on the engine based on a high-voltage battery power consumed by a low direct voltage converter (LDC), and operate the engine based on the determined inlet temperature of the GPF.

9. The vehicle according to claim 1, wherein the controller is configured to determine whether to turn on the engine based on a charging amount of a high-voltage battery, and operate the engine based on the determined inlet temperature of the GPF.

10. The vehicle according to claim 1, wherein the controller is configured to calculate the second soot mass based on at least one of the first soot mass, a soot accumulation speed, an average time of ignition or a time correction.

11. A controlling method of a vehicle, comprising:
  determining, by a controller, whether to turn on an engine for an air conditioner;
  calculating, by the controller, a second soot mass estimated at ignition off based on a first soot mass stored in a gasoline particulate filter (GPF);
  determining, by the controller, an inlet temperature of the GPF based on the second soot mass and a predetermined reference value;
  operating, by the controller, the engine based on the determined inlet temperature of the GPF;
  receiving, by the controller, a temperature value of the air conditioner from a user input; and
  comparing, by the controller, a cooling water temperature with a heating temperature of the air conditioner.

12. The method according to claim 11, wherein the determining of the inlet temperature of the GPF includes:
  determining, by the controller, the inlet temperature of the GPF based on the comparison and a driving speed of the vehicle.

13. The method according to claim 11, wherein the determining of the inlet temperature of the GPF includes:
  determining, by the controller, a first inlet temperature of the GPF when the second soot mass exceeds the predetermined reference value; and
  determining, by the controller, a second inlet temperature of the GPF less than the first inlet temperature of the GPF when the second soot mass is equal to or less than the predetermined reference value.

14. The method according to claim 11, wherein the operating of the engine includes:
  operating, by the controller, the engine based on at least one of a revolutions per minute (RPM), an ignition timing, or an air-conditioning ratio.

15. The method according to claim 11, further comprising:
  turning off, by the controller, the engine when the detected first soot mass is equal to or less than the predetermined reference value.

16. The method according to claim 11, further comprising:
  determining, by the controller, whether to turn on the engine based on a high-voltage battery power consumed by a low direct voltage converter (LDC).

17. The method according to claim 11, further comprising:
  determining, by the controller, whether to turn on the engine based on a charging amount of a high-voltage battery.

18. The method according to claim 11, wherein the calculating of a second soot mass includes:
  calculating, by the controller, the second soot mass based on at least one of the first soot mass, a soot accumulation speed, an average time of ignition or a time correction.

* * * * *